| United States Patent [19] | [11] Patent Number: 4,684,578 |
| --- | --- |
| Inoue et al. | [45] Date of Patent: Aug. 4, 1987 |

[54] MODIFIED ELASTOMER AND LAMINATE THEREOF

[75] Inventors: Hiroshi Inoue; Makoto Miyazaki; Masaaki Isoi; Makoto Yoda, all of Saitama, Japan

[73] Assignee: Toa Nenryo Kogyo Kabushiki Kaisha, Tokyo, Japan

[21] Appl. No.: 918,165

[22] Filed: Oct. 10, 1986

Related U.S. Application Data

[60] Division of Ser. No. 717,538, Mar. 29, 1985, which is a continuation of Ser. No. 196,076, Oct. 10, 1980, abandoned.

[30] Foreign Application Priority Data

Oct. 12, 1979 [JP] Japan .................................. 54-130835

[51] Int. Cl.$^4$ ............................................. B32B 15/08
[52] U.S. Cl. .................................. 428/462; 428/476.3; 428/476.9; 428/483; 428/521; 428/522; 428/518

[58] Field of Search .................. 428/462, 476.3, 476.9, 428/483, 521, 522, 500, 518; 525/193

[56] References Cited

U.S. PATENT DOCUMENTS

| 4,134,927 | 1/1979 | Tomoshige | 525/301 |
| 4,212,956 | 7/1980 | Katsura | 428/520 |
| 4,247,661 | 1/1981 | Herman | 525/240 |
| 4,255,490 | 3/1981 | Katsura | 428/483 |
| 4,336,351 | 6/1982 | Cinddr | 525/240 |
| 4,400,488 | 8/1983 | Lal | 525/240 |

*Primary Examiner*—Edith Buffalow

[57] ABSTRACT

Modified polymer compositions comprising elastomers blended with not more than 50 parts by weight of a crystalline polyolefin are prepared by reaction of the polymers with an unsaturated carboxylic acid or its acid anhydride. The modified composition optionally containing a filler, is particularly suitable for laminating to metals and other polymers; laminates show superior hot water resistance, salt water resistance and thermal shock resistance.

7 Claims, 1 Drawing Figure

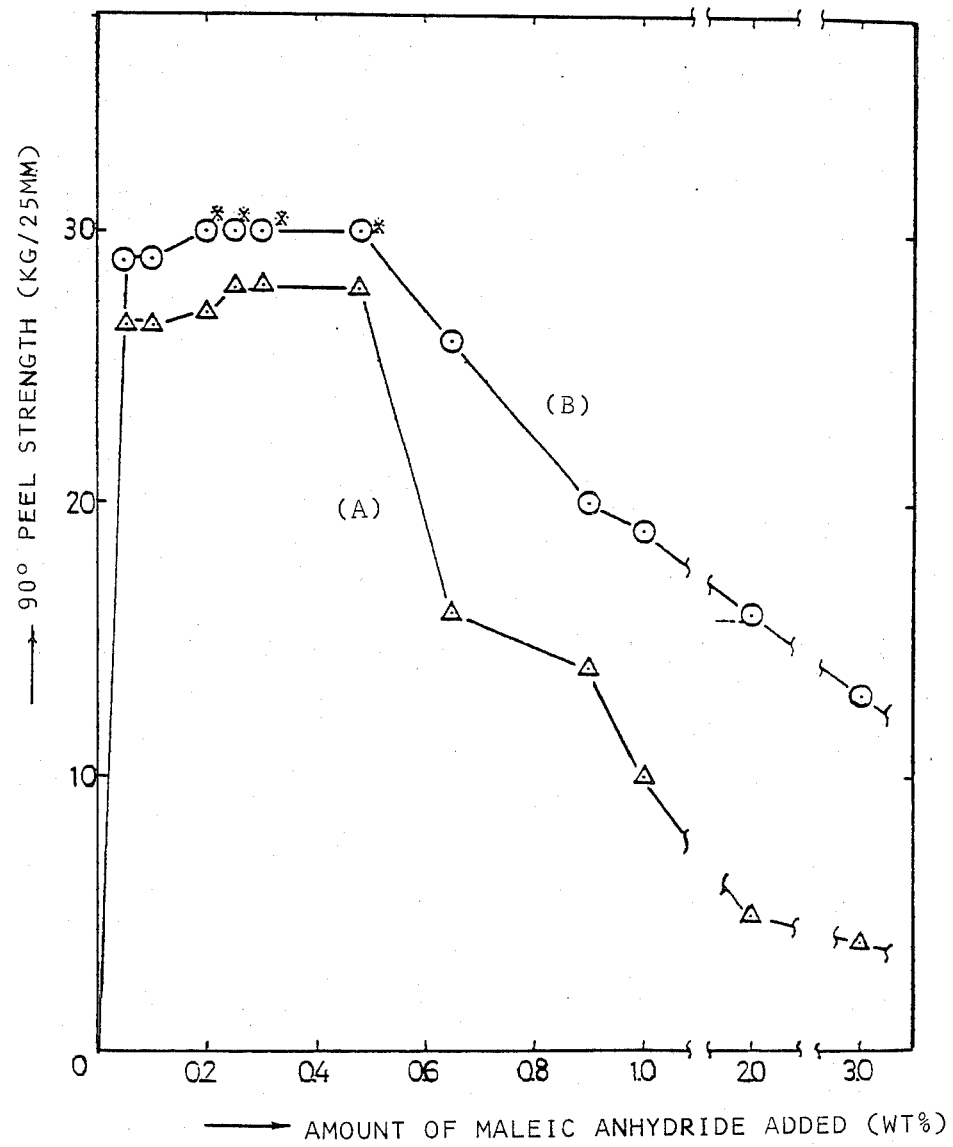

MODIFIED ELASTOMER AND LAMINATE THEREOF

This is a division, of application Ser. No. 717,538, filed 3/29/85 which is a continuation of application Ser. No. 196,076 filed 10/10/80, now abandoned.

BACKGROUND OF THE INVENTION

1. Field of the Invention

This invention relates to a modified elastomer, and a laminate comprising said modified elastomer. More specifically, this invention relates to a modified elastomer having high adhesion to metals, polyolefins, polyamides, polyesters, polyvinyl chloride or polyvinyl alcohol, and a laminate of the modified elastomer having superior hot water resistance, salt water resistance and thermal shock resistance.

The accompanying drawing is a graph showing the relation of the amount of the unsaturated carboxylic acid added to the effect in the present invention.

Heretofore, in order to improve the corrosion resistance or appearance of metals, various synthetic resins have been coated on the inside and outside surfaces of metal tubes, metal plates, wires, etc., or in order to remedy the defects of various synthetic resins, laminates of these resins bonded to other resins have been suggested. As such synthetic resin materials, polyolefins which are inexpensive and have various excellent physical and chemical properties have attracted attention as laminates with metals or other synthetic resins. Since polyolefins are inherently non-polar, their affinity for metals or various synthetic resins is small, and they have the defect of being unable to be easily bonded to metals and synthetic resins. Various methods have therefore been suggested in order to remedy this defect.

For example, there have been proposed a laminate composed of a metal and a polyolefin bonded through a modified polyolefin having an unsaturated carboxylic acid such as maleic anhydride graft-copolymerized therewith (Japanese Patent Publication No. 10757/67); a method for obtaining a laminated sheet by co-extruding nylon and a polyolefin modified with an unsaturated carboxylic acid or is anhydride (Japanese Patent Publication No. 43055/76); a method for improving the adhesion strength of polyolefins which comprises adding 1 to 20% by weight of a rubber compound to a crystalline polyolefin and modifying it with an unsaturated carboxylic acid or its anhydride (Japanese Laid-Open Patent Publication No. 8035/77); and a method which comprises laminating a composition comprising 70 to 98% by weight of a crystalline polyolefin and 30 to 2% by weight of a copolymer of an -olefin and modified ethylene having maleic anhydride grant-polymerized therewith or a modified polyolefin resulting from reaction of a mixture of 70 to 98% by weight of a crystalline polyolefin and a copolymer of ethylene and an -olefin with an unsaturated carboxylic acid or its anhydride, to a polyamide, a polyester or a saponified product of an ethylene/vinyl acetate copolymer (Japanese Laid-Open Patent Publication Nos. 82/79 and 83/79).

The modified polyolefins whose adhesion strength has been increased by these methods, however, decrease in adhesion strength within short periods of time upon contact with electrolyte-containing water such as sea water or saline solution or with heated liquids or upon being subject to temperature change, and peel from the bonded surface. Furthermore, their adhesion strength is still not entirely sufficient in application to co-extrusion and blow molding which require higher adhesion strength. In order to have the adhesiveness of the modified polyolefins exhibited, high temperatures of about 200° C. are usually required in the processing step, and a huge cost of energy is spent. It is desired therefore to decrease the processing temperature. Modified polymers and their use in laminates are broadly disclosed in United States Patent 3,862,265 (R. A. Steinkamp, et al) wherein critical extrusion conditions were required in order to effect said modification. In addition, the reference did not recognize the need to control the concentration of unsaturated carboxylic acid or its anhydride and the level of crystalline polyolefin in order to achieve the very high adhesion levels, hot water resistance, salt water resistance and thermal shock resistance demonstrated in the present invention.

The present inventors made various investigations in order to solve the aforesaid problems, and consequently found that a product obtained by selecting an ethylene/butene-1 copolymer, a styrene/butadiene copolymer or an ethylene/propylene copolymer as an elastomer, and modifying 100 parts by weight of the elastomer with 0.005 to 0.8 part by weight of an unsaturated carboxylic acid or its acid anhydride shows a very high adhesion strength. This discovery has led to the present invention.

Thus, the present invention provides (1) a modified elastomer resulting from addition reaction of 100 parts by weight of at least one elastomer selected from an ethylene/butene-1 copolymer, a styrene/butadiene copolymer and an ethylene/propylene copolymer or 100 parts by weight of a mixture of at least one said elastomer and not more than 50 parts by weight of a crystalline polyolefin, with 0.005 to 0.8 part by weight of an unsaturated carboxylic acid or its anhydride; and (2) a laminate comprising (A) a modified elastomer resulting from addition reaction of 100 parts by weight of at least one elastomer selected from an ethylene/butene-1 copolymer, a styrene/butadiene copolymer and an ethylene/propylene copolymer with 0.005 to 0.8 part by weight of an unsaturated carboxylic acid or its anhydride, or (B) a modified elastomer resulting from addition reaction of 100 parts by weight of a mixture of at least one said elastomer and not more than 50 parts by weight of a crystalline polyolefin with 0.005 to 0.8 part by weight of an unsaturated carboxylic acid or its anhydride, or (C) a composition comprising (A) or (B) and a filler, and a material selected from the group consisting of metals, polyamide, polyesters, polyvinyl chloride and polyvinyl alcohol.

The elastomer used in this invention is an ethylene/butene-1 copolymer, an ethylene/propylene copolymer, a styrene/butadiene copolymer, or mixtures thereof. Desirably, it has a tensile strength of at least 60 kg/cm$^2$, especially at least 100 kg/cm$^2$. When the tensile strength of the elastomer itself is low, it is desirable to increase it by adding a crystalline polyolefin such as polyethylene, polypropylene, polybutene-1 or mixtures thereof. The ethylene/butene-1 copolymer preferably has an ethylene content of 10 to 90% by weight, especially 70 to 85% by weight, and a Mooney viscosity (ASTM D927-57T; the same applies hereinbelow) of 10 to 200 at 100° C. The styrene(S)/butadiene(B) copolymer is, for example, a random copolymer such as styrene butadiene rubber (SBR), SBS-type block copolymer or BSB-type block copolymer or styrene and butadiene having a styrene content of 5 to 70% by weight, preferably 20 to 40% by weight, and a Mooney viscosity of 10 to 200 at 100° C. A styrene/butadiene block copolymer having the SBS-type block structure and a high tensile strength is especially preferred. The ethylene/propylene copolymer preferably has an ethylene content of 10 to 90% by weight, especially 30 to 80% by weight, a Mooney viscosity of 10 to 200 at 100° C. and a density of 0.85 to 0.90.

The crystalline polyolefin used in this invention includes homopolymers of olefins or copolymers of different kinds of olefins, such as high-density polyethylene, medium-density polyethylene, low-density polyethylene, crystalline ethylene/propylene copolymer, crystalline ethylene/butene-1 copolymer, polypropylene, crystalline propylene/ethylene copolymer, polybutene-1 and poly(4-methyl-pentene-1). Mixtures of two or more of these polymers or copolymers may be used. High-density polyethylene, low-density polyethylene and polypropylene are especially preferred among them.

Examples of the unsaturated carboxylic acids or the anhydrides thereof include acrylic acid, methacrylic acid, fumaric, acid, maleic acid, maleic anhydride, citraconic acid, citroconic anhydride, itaconic acid, itaconic anhydride, endo-bicyclo-[2.2.1]-1,4,5,6,7,7-hexachloro-5-heptene-2,3-dicarboxylic acid, endo-bicyclo-[2.2.1]-1,4,5,6,7,7-hexachloro-5-heptene-2,3-dicarboxylic anhydride, endo-bicyclo-[2.2.1]-5-heptene-2,3-dicarboxylic acid, endo-bicyclo-[2.2.1]-5-heptene-2,3-dicarboxylic anhydride, cis-4-cyclohexene-1,2-dicarboxylic acid, amd cis-4-cyclohexene-1,2-dicarboxylic anhydride. Of these, maleic anhydride, acrylic acid, and endo-bicyclo-[2.2.1]-5-heptene-2,3-dicarboxylic anhydride are especially preferred.

The amount of the unsaturated carboxylic acid or its anhydride is 0.005 to 0.8 part by weight, preferably 0.1 to 0.7 part by weight, per 100 parts by weight of the elastomer composed of at least one of the ethylene/butene-1 copolymer, styrene/butadiene copolymer and ethylene/propylene copolymer or a mixture of it with the crystalline polyolefin. If the amount of the unsaturated carboxylic acid or its anhydride is less than 0.005 part by weight, the adhesion strength of the resulting product is not sufficient. If, on the other hand, it exceeds 0.8 part by weight, the peel strength of the resulting product decreases. By maintaining the amount of the unsaturated carboxylic acid low as in the present invention, the formation of an increased amount of a gel-like product, increased coloration, etc. can be inhibited.

The modified elastomer of this invention can be produced by adding the unsaturated carboxylic acid or its anhydride to the elastomer comprising at least one member of the group consisting of ethylene/butene-1 copolymer, styrene/butadiene copolymer and ethylene/propylene copolymer or a mixture of said elastomer with the crystalline polyolefin and applying various known modifying methods. For example, it can be obtained by adding the unsaturated carboxylic acid or is anhydride with or without a radical generator, for example an organic peroxide such as ditertiary butyl peroxide, dicumyl peroxide or benzoyl peroxide, to the elastomer composed of at least one of the aforesaid ethylene/butene-1 copolymer, styrene/butadiene copolymer and ethylene/propylene copolymer, mixing them in a mixer such as Henschel mixer, ribbon blender, V-shaped blender or tumbler, and melting and kneading the mixture at 120° to 300° C., preferably 180 to 250° C., in a Banbury mixer, or a single-screw or multi-screw extruder. Alternatively, it can be obtained by dispersing the aforesaid copolymer substrate and the unsaturated carboxylic acid or its anhydride in water or an organic solvent, and heating the dispersion in the presence of the aforesaid radical generator or a water-soluble peroxide.

The mixing proportions of the ethylene/butene-1 copolymer, styrene/butadiene copolymer or ethylene/propylene copolymer, and the crystalline polyolefin are such that the amount of the former is at least 50 parts by weight, preferably at least 70 parts by weight, and the amount of the latter is not more than 50 parts by weight, preferably not more than 30 parts by weight. If the amount of the crystalline polyolefin exceeds 50 parts by weight per 50 parts by weight of the ethylene/butene-1 copolymer, styrene/butadiene copolymer, or ethylene/propylene copolymer, the characteristics of the modified elastomer are lost, and the effect of improving the adhesion of the elastomer is not sufficient. In particular, the hot water resistance, salt water resistance and thermal shock resistance of the product are inferior. The amount of the organic peroxide is not more than 0.1 part by weight, preferably 0.001 to 0.08 part by weight, per 100 parts by weight of the ethylene/butene-1 copolymer, styrene/butadiene copolymer or ethylene/propylene copolymer or a mixture of the copolymer with the crystalline polyolefin.

Desirably, the resulting modified elastomer is used alone. It is possible however to use it after adding to it an unmodified elastomer or crystalline polyolefin or a mixture of these. Such a product can be produced, for example, by mixing 0.005 to 0.8 part by weight, preferably 0.1 to 0.7 part by weight, of the unsaturated carboxylic acid or its anhydride and less than about 0.1 part by weight, preferably 0.001 to 0.08 part by weight, of an organic peroxide with 100 parts by weight of an elastomer comprising at least one member of the group consisting of ethylene/butene-1 copolymer, styrene/butadiene copolymer and ethylene/propylene copolymer or a mixture of the elastomer with the crystalline polyolefin, and kneading the mixture at a temperature of 120° to 300° C., preferably 180° to 250° C., mixing the resulting modified elastomer and an unmodified elastomer or a crystalline polyolefin in a mixer such as a ribbin blender, V-shaped blender, tumbler or Henschel mixer, and melting and kneading the mixture at 120° to 250° C. in a Banbury mixer, or a single-screw or multi-screw extruder. In the modified elastomer composition composed of the modified elastomer and the unmodified elastomer or crystalline polyolefin, the mixing ratio of the individual ingredients can be selected as desired according to the purpose of use. If the amount of the unmodified elastomer or crystalline polyolefin increases, the properties of the modified elastomer will be lost and the improvement of adhesiveness is not sufficient. In particular, the hot water resistance, salt water resistance and thermal shock resistance of the resulting composition become inferior. The amount of the unmodified elastomer or crystalline polyolefin added is not more than 100 parts by weight, preferably not more than 43 parts by weight, per 100 parts by weight of the modified elastomer. However, when the modified elastomer contains the crystalline polyolefin, the amount of the crystalline polyolefin is desirably decreased so that the total amount of the crystalline polyolefin contained in 100 parts by weight of the modified elastomer composition is not more than 50 parts by weight. If required, the modified elastomer or elastomer composition may contain various fillers such as calcium carbonate, white carbon, carbon black, talc, clay and barium sulfate, antioxidants, ultraviolet absorbers, various stabilizers, antistatic agents, mold releasing agents, lubricants, pigments, etc.

The metal used in the laminate of this invention includes, for example, aluminum, copper, zinc, nickel, iron, tin, stainless steel, brass, tin-plated iron, and galvanized sheet steel. The polyamide is a polymer having recurring units of an acid amid (—CONH—) and obtained by ring-opening polymerization of a lactam, polycondensation of an aminocarboxylic acid, or polycondensation of a diamine with a dibasic acid. It is called Nylon by the tradename. Examples are Nylon 6, Nylon 66, Nylon 11, Nylon 12 and Nylon 6, 10. The polyester is a polymeric compound having an ester linkage in the main chain of the molecule, and is usually obtained by polycondensation between a dibasic acid and a dihydric alcohol. Examples are polyethylene terephthalate and polybutylene terephthalate. Polyvinyl chloride is a homopolymer of a vinyl chloride monomer alone or a copolymer resulting from copolymerization of a vinyl chloride polymer with another monomer such as vinyl acetate, and is of various grades such as the soft, hard, and high impact grades. Polyvinyl alcohol is a water-soluble resin obtained by saponifying polyvinyl acetate having a degree of polymerization of 1200 to 2000. A polymer under the tradename Vinylon is an example of a polymer starting from this resin.

The laminate in this invention is obtained by melt lamination of the aforesaid modified elastomer or modified elastomer composition and a material selected from the aforesaid metals, polyamides, polyesters, polyvinyl chloride, polyvinyl alcohol and polyolefins. The method of lamination is not particularly limited. There can be utilized known methods, such as a method which comprises forming the individual components into films or sheets and bonding them under heat and pressure, a method which comprises laminating them outside a die, a method which comprises laminating them inside a die, or a method which comprises extrusion and coating them in laminated layers. Basically, the laminate of the present invention has a two-layer structure in which the modified elastomer or modified elastomer composition is laminated to a material selected from the metals, polyolefins, polyamides, polyesters, polyvinyl chloride and polyvinyl alcohol, and a three-layer structure in which the modified elastomer or modified elastomer composition is sandwiched. Depending upon uses, various other combinations can be used so long as they include the basic constituent elements.

The modified elastomer or modified elastomer composition in accordance with this invention shows good adhesion to the aforesaid metals or resins, and a laminate having a high adhesion strength can be made. The adhesion surface of the laminate has markedly improved hot water resistance, salt water resistance and thermal shock resistance over laminates having the conventional modified polyolefin as an interlayer.

The resin laminate obtained by this invention is useful a a packaging film or sheet, bottles, containers, etc. by taking advantage of its gas impermeability, moisture resistance, oil resistance, etc. It can also be used as an interlayer in coating a metal such as a wire, cable, metal plate, metal tube and other metal inserts. In this case, the modified elastomer or its composition of this invention is adhered to the metal to be coated or a sheet made of the modified elastomer or its composition is wrapped around it. A molded article containing the metal and having a high adhesion strength can be obtained by setting the assembly in a mold and molding polyolefin therein.

EXAMPLES 1 TO 21 AND COMPARATIVE EXAMPLES 1 TO 3

An ethylene/butene-1 copolymer (abbreviated $C_2$=-$C_4$=-1 hereinbelow) having an ethylene content of 77% by weight, a melt index (ASTM D-1238E, the same applies hereinbelow; abbreviated MI) of 4.0 (190° C.) and a density of 0.89, an SBS-type styrene/butadiene block copolymer (to be abbreviated SBR hereinbelow) having a styrene content of 40% by weight, an MI of 2.6 (190° C.) and a density of 0.95, an ethylene/propylene rubber (to be abbreviated EPR hereinbelow) having an ethylene content of 74% by weight, an MI of 1.4 (190° C.) and a density of 0.88, low-density polyethylene [density=0.919, MI=10.0 (190° C.); to be abbreviated LDPE hereinbelow], high-density polyethylene [density=0.961, MI=8.0 (190° C.); to be abbreviated HDPE hereinbelow], maleic anhydride, endo-bicyclo-[2.2.1]-5-heptene-2,3-dicarboxylic anhydride (to be abbreviated dicarboxylic anhydride-H hereinbelow), and ditertiary butyl peroxide (to be abbreviated DTBP hereinbelow) were mixed in the proportions show in Table 1 by a Henschel mixer at room temperature. The mixture was fed into a vent-equipped extruder having a screw diameter of 65 mm, and extruded at 230° C. to form cylindrical pellets.

The resulting pellets of the modified elastomer were formed into a 0.2 mm-thick sheet by a hot press former at 200° C. and 40 kg/cm$^2$. A three-layer structure composed of an aluminum sheet/the modified elastomer sheet/aluminum sheet was prepared from the resulting sheet and 0.1 mm-thick aluminum sheets by melt-bonding at a pretreating and bonding temperature of 80° C., 100° C. and 200° C., respectively, under a pressure of 40 kg/cm$^2$ for 2 minutes. The three-layer laminate was cut to a width of 25 mm, and its 90° peel strength was measured by a Instron universal tensile tester. The results are shown in Table 1.

The laminate was also tested for hot water resistance, salt water resistance and thermal shock resistance using samples prepared by processing a two-layer laminate of the aforesaid modified elastomer and a phosphoric acid-treated iron plate (JIS G-3141, 0.7 mm×70 mm×120 mm) in the same way as in the preparation of the laminate for measurement of delamination peel strength. The thickness of the modified elastomer was 0.15 mm.

(1) Test for hot water resistance

A cross hatch, 60 mm long, reaching the metal, was provided in the modified elastomer layer of the twolayer laminate using a sharp knife, and the laminate was immersed in hot water at 60° C. The time (days) which elapsed until the water permeated from the cross hatch to an extent of 2 mm was measured, and defined as the durable time.

(2) Test for salt water resistance

The same cross hatch as in the sample for the hot water resistance test was provided, and the two-layer laminate was immersed in a 3% aqueous solution of sodium chloride at 50° C. The time (days) which elapsed until the salt water permeated from the cross hatch to an extent of 2 mm was measured, and defined as the durable time.

(3) Thermal shock resistance

The two-layer laminate was subjected to a cycle of room temperature (30 minutes) 50° C. (2 hours) room temperature (30 minutes) −30° C. (2 hours) room temperature, and the number of cycles which was repeated until the modified elastomer layer peeled off from the zinc phosphate-treated iron plate was determined, and defined as cycles of thermal shock resistance. The results are shown in Table 1.

TABLE 1

| | Starting resin | | | | Modifier Unsaturated carboxylic acid or its anhydride | | DTBP |
|---|---|---|---|---|---|---|---|
| | Elastomer | | Polyolefin | | | | |
| | Type | Amount (parts by weight) | Type | Amount (parts by weight) | Type | Amount (parts by weight) | Amount (parts by weight) |
| Example | | | | | | | |
| 1 | $C_2^=-C_4^=-1$ | 100 | — | — | Maleic anhydride | 0.05 | 0.07 |
| 2 | " | 100 | — | — | " | 0.1 | 0.07 |
| 3 | " | 100 | — | — | " | 0.3 | 0.07 |
| 4 | " | 100 | — | — | " | 0.6 | 0.07 |
| 5 | " | 100 | — | — | " | 0.8 | 0.08 |
| 6 | " | 100 | — | — | Dicarboxylic-anhydride-H | 0.1 | 0.07 |
| 7 | " | 100 | — | — | Dicarboxylic-anhydride-H | 0.2 | 0.07 |
| 8 | " | 100 | — | — | Dicarboxylic-anhydride-H | 0.5 | 0.08 |
| 9 | " | 100 | — | — | Dicarboxylic-anhydride-H | 0.8 | 0.08 |
| 10 | 8BR | 100 | — | — | Maleic anhydride | 0.3 | 0.01 |
| 11 | " | 100 | — | — | Dicarboxylic anhydride-H | 0.5 | 0.01 |
| 12 | " | 100 | — | — | Acrylic acid | 0.5 | 0.01 |
| 13 | EPR | 100 | — | — | Maleic anhydride | 0.3 | 0.06 |
| 14 | $C_2^=-C_4^=-1$ | 90 | HDPE | 10 | " | 0.3 | 0.07 |
| 15 | " | 80 | " | 20 | " | 0.3 | 0.07 |
| 16 | " | 80 | LDPE | 20 | " | 0.3 | 0.07 |
| 17 | " | 70 | " | 30 | " | 0.3 | 0.07 |
| 18 | 8BR | 80 | HDPE | 20 | " | 0.3 | 0.01 |
| 19 | $C_2^=-C_4^=-1$ | 75 | IEPR | 25 | " | 0.3 | 0.07 |
| 20 | " | 50 | " | 50 | " | 0.3 | 0.07 |
| 21 | " | 25 | " | 75 | " | 0.3 | 0.07 |
| Comparative Example | | | | | | | |
| 1 | " | 100 | — | — | Dicarboxylic anhydride-H | 1.5 | 0.08 |
| 2 | " | 100 | — | — | Maleic anhydride | 3.0 | 0.10 |
| 3 | " | 100 | — | — | " | 5.0 | 0.10 |

| | Properties of the modified elastomer | | | | | |
|---|---|---|---|---|---|---|
| | Amount of unsaturated acid added (wt. %) | 90° Peel strength (kg/25 mm) | | | Adhesion strength durability | | |
| | | Aluminum sheet, bonded at 80° C. | Aluminum sheet, bonded at 100° C. | Aluminum sheet, bonded at 200° C. | Hot water resistance (days/ 60° C.) | Salt water resistance (days/3% Nacl, 50° C.) | Thermal shock resistance (cycles/ −30° C., 50° C.) |
| Example | | | | | | | |
| 1 | 0.04 | 24.0 | 26.5 | 22.0 | >50 | 10 | >20 |
| 2 | 0.08 | 24.0 | 26.5 | 29.0 | >50 | >10 | >20 |
| 3 | 0.25 | 26.0 | 28.0 | >30 | >50 | >10 | >20 |
| 4 | 0.40 | 26.0 | 28.2 | >30 | >50 | >10 | >20 |
| 5 | 0.65 | 15.0 | 18.0 | 26.0 | 45 | 7 | >20 |
| 6 | 0.07 | 23.5 | 26.0 | 29.0 | 50 | 10 | >20 |
| 7 | 0.14 | 25.0 | 27.0 | >30 | >50 | >10 | >20 |
| 8 | 0.32 | 26.0 | 28.0 | >30 | >50 | >10 | >20 |
| 9 | 0.55 | 18.0 | 28.0 | 27.0 | 50 | >10 | >20 |
| 10 | 0.27 | 26.0 | 28.5 | >30 | >50 | >10 | >20 |
| 11 | 0.35 | 26.5 | 29.5 | >30 | >50 | >10 | >20 |
| 12 | 0.40 | 26.0 | 28.0 | >30 | >50 | >10 | >20 |
| 13 | 0.23 | 6.0 | 9.0 | 10.0 | >50 | >10 | >20 |
| 14 | 0.25 | 28.0 | 24.5 | 29.5 | >50 | >10 | >20 |
| 15 | 0.24 | 18.0 | 22.0 | 28.0 | 50 | 8 | >20 |
| 16 | 0.24 | 16.0 | 20.0 | 25.0 | 50 | 8 | >20 |
| 17 | 0.21 | 10.0 | 12.5 | 26.0 | 45 | 5 | >20 |
| 18 | 0.25 | 16.0 | 23.5 | 27.0 | >50 | 9 | >20 |
| 19 | 0.24 | 21.0 | 24.0 | 28.0 | >50 | >10 | >20 |
| 20 | 0.23 | 17.0 | 20.0 | 24.0 | >50 | >10 | >20 |
| 21 | 0.24 | 12.0 | 14.0 | 17.0 | >50 | >10 | >20 |
| Comparative Example | | | | | | | |
| 1 | 1.0 | 6.0 | 10.0 | 19.0 | 40 | 5 | 15 |
| 2 | 2.0 | 3.0 | 5.0 | 16.0 | 30 | 3 | 8 |
| 3 | 3.0 | 2.0 | 4.0 | 13.0 | 20 | 1 | 3 |

EXAMPLE 22

Using modified $C_2^=-C_4^=-1$ having varying amounts of maleic anhydride grafted thereto obtained by varying the amount of maleic anhydride added in Example 1, a threelayer laminate of aluminum sheet/modified $C_2=$-$C_4=$/aluminum sheet was prepared at a bonding temperature of 100° C. and 200° C., respectively, by the same method as in Example 1. The 90° C. peel strength of the three-layer laminate was measured by the same method as used in Example 1, and the results are shown in FIG. 1. In the figure (A) represents the results obtained with the laminate bonded at a temperature of 100° C., and (B) represents the results obtained with the laminate bonded at 200° C. * shows that the aluminum sheet broke.

It is seen from the figure that the laminate obtained when the amount of maleic anhydride grafted was less than about 0.65% by weight (the amount of maleic anhydride added was 0.8.% by weight or less) have a high peel strength.

COMPARATIVE EXAMPLES 4 TO 7

Each of polypropylene [MI=1.0 (230° C.), density 0.90; to be abbreviated PP hereinbelow], a propylene-/ethylene block copolymer [ethylene content 7% by weight, MI=1.0 (230° C.), density 0.90; to be abbreviated P/E block hereinbelow], ethylene/propylene rubber [ethylene content 74% by weight, MI=1.9 (190° C.), density 0.88; to be abbreviated EPR hereinbelow], HDPE used in Example 6, and LDPE used in Example 8 in the proportions indicated in Table 2 was modified in the same way as in Example 1. Each of the modified polyolefins was laminated to form test specimens in the same ways as in Example 1, and tested for 90° C. peel strength, and adhesion durability represented by hot water resistance, salt water resistance and thermal shock resistance. The results are shown in Table 2.

TABLE 2

| Comparative Example | Starting resin Type | Starting resin Amount (parts by weight) | Modifier Unsaturated carboxylic acid anhydride Type | Modifier Unsaturated carboxylic acid anhydride Amount (parts by weight) | DTBP Amount (parts by weight) | Properties of the modified polyolefin Amount of the unsaturated acid grafted (wt. %) | Properties of the modified polyolefin 90° Peel strength (kg/25 mm) Bonded to an aluminum sheet at 80° C. |
|---|---|---|---|---|---|---|---|
| 4 | PP | 100 | Dicarboxylic anhydride-H | 1.0 | 0.3 | 0.30 | Adhesion did not occur |
| 5 | P/E block | 100 | Dicarboxylic anhydride-H | 1.0 | 0.3 | 0.40 | Adhesion did not occur |
| 6 | LDPE | 100 | Maleic anhydride | 0.3 | 0.06 | 0.27 | Adhesion did not occur |
| 7 | HDPE/ EPR | 70/30 | Maleic anhydride | 0.3 | 0.07 | 0.22 | Adhesion did not occur |

| Comparative Example | Properties of the modified polyolefin 90° Peel strength (kg/25 mm) Bonded to an aluminum sheet at 100° C. | Properties of the modified polyolefin 90° Peel strength (kg/25 mm) Bonded to an aluminum sheet at 200° C. | Adhesion strength durability Hot water resistance (days/60° C.) | Adhesion strength durability Salt water resistance (days/3% NaCl, 50° C.) | Thermal shock resistance (cycles/ −30° C., 50° C.) |
|---|---|---|---|---|---|
| 4 | Adhesion did not occur | 4.0 | 0.1 | 0.05 | 2 |
| 5 | Adhesion did not occur | 5.0 | 0.2 | 0.05 | 2 |
| 6 | Adhesion did not occur | 3.0 | 0.5 | 0.05 | 5 |
| 7 | Adhesion did not occur | 5.0 | 5 | 0.5 | 10 |

EXAMPLES 23 TO 28 AND COMPARATIVE EXAMPLES 8 TO 11

$C_2=$-$C_4=$-1 and ethylene/butene-1 copolymer modified with maleic anhydride (to be abbreviated MA-modified $C_2=$-$C_4=$-1 of Example, 1, maleic anhydride-modified styrene/butadiene block copolymer (to be abbreviated MAmodified SBR hereinbelow) of Example 3, the dicarboxylic anhydride-H modified styrene/-butadiene block copolymer (to be abbreviated HA-modified SBR hereinbelow) of Example 4, HDPE used in Example 6, modified HDPE (to be abbreviated MAHDPE hereinbelow) obtained by modifying the aforesaid HDPE by the same method as in Example 1, LDPE used in Example 8, and PP having an MI of 5.0 and a density of 0.90 were mixed in the proportions shown in Table 3 in a Henschel mixer at room temperature. The mixture was fed into a vent-equipped extruder having a screw diameter of 65 mm, and extruded at 230° C. to form a modified elastomer composition in the form of cylindrical pellets.

Test specimens were prepared from the modified elastomer composition by the same method as in Example 1, and tested for 90° peel strength durability represented by hot water resistance, salt water resistance and thermal shock resistance. The results are shown in Table 3.

TABLE 3

| | Modified elastomer composition | | | | Properties of the modified elastomer composition | | |
|---|---|---|---|---|---|---|---|
| | | | | | 90° Peel strength (kg/25 mm) | | |
| | Modified elastomer | | Polyolefin | | Bonded to aluminum sheet at 80° C. | Bonded to aluminum sheet at 100° C. | Bonded to aluminum sheet at 200° C. |
| | Type | Amount (parts by weight) | Type | Amount (parts by weight) | | | |
| Example | | | | | | | |
| 23 | HA-modified $C_2^=-C_4^=-1$ | 80 | PP | 20 | 14.0 | 20.0 | 26.8 |
| 24 | HA-modified $C_2^=-C_4^=-1$ | 80 | HDPE | 20 | 15.0 | 20.5 | 27.0 |
| 25 | HA-modified $C_2^=-C_4^=-1$ | 80 | LDPE | 20 | 14.0 | 18.0 | 25.0 |
| 26 | HA-modified $C_2^=-C_4^=-1$ | 50 | HDPE | 50 | 3.0 | 6.0 | 18.0 |
| 27 | HA-modified 8BR | 80 | " | 20 | 14.0 | 22.0 | 28.0 |
| 28 | HA-modified 8BR | 80 | " | 20 | 13.0 | 22.0 | 27.5 |
| Comparative Example | | | | | | | |
| 8 | HA-modified $C_2^=-C_4^=-1$ | 30 | " | 70 | No adhesion occurred. | 1.0 | 2.00 |
| 9 | HA-modified HDPE 1 | 60 | $C_2^=-C_4^=-1$ | 40 | No adhesion occurred. | 0.5 | 8.0 |
| 10 | HA-modified HDPE 1 | 80 | $C_2^=-C_4^=-1$ | 20 | No adhesion occurred. | No adhesion occurred. | 5.0 |
| 11 | HA-modified HDPE 1 | 20 | $C_2^=-C_4^=-1$ | 80 | No adhesion occurred. | No adhesion occurred. | 6.0 |

| | Properties of the modified elastomer composition | | |
|---|---|---|---|
| | Adhesion strength durability | | |
| | Hot water resistance (days/60° C.) | Salt water resistance (days/3% NaCl, 50° C.) | Thermal shock resistance (days/−30° C., 50° C.) |
| Example | | | |
| 23 | 45 | 7 | >20 |
| 24 | 45 | 7 | >20 |
| 25 | 45 | 7 | >20 |
| 26 | 20 | 3 | >20 |
| 27 | 50 | 9 | >20 |
| 28 | 50 | 8 | >20 |
| Comparative Example | | | |
| 8 | 5 | 0.05 | 10 |
| 9 | 4 | 0.1 | 10 |
| 10 | 2 | 0.05 | 4 |
| 11 | 10 | 0.5 | 15 |

EXAMPLES 29 TO 32 AND COMPARATIVE EXAMPLES 12 AND 13

Three-layer laminates of various metals or resins as shown in Table 4 were prepared by the same method as in Example 1 using the modified elastomer composition of Examples 1, 6, 10 and 13 and the modified polyolefins of Comparative Examples 2 and 4. The 90° peel strength of each of these three-layer laminates was measured. The results are shown in Table 4.

TABLE 4

| Adhesive resin | Example 29 Modified elastomer of Example 1 | Example 30 Modified elastomer of Example 6 | Example 31 Modified elastomer of Example 10 | Example 32 Modified elastomer of Example 13 | Comparative Example 12 Modified polyolefin of Comparative Example 2 | Comparative Example 13 Modified polyolefin of Comparative Example 5 |
|---|---|---|---|---|---|---|
| 90° Peel strength (kg/25 mm) | | | | | | |
| LDPE | Not peelable | 5.0 | Not peelable | 7.0 | 1.5 | Not peelable |
| HDPE | " | 6.0 | " | 8.5 | 1.5 | " |
| PP | 2.5 | 2.0 | 2.5 | 2.0 | Not peelable | 3.0 |
| E/P block copolymer | 4.5 | 3.0 | 6.0 | 3.5 | " | 4.5 |
| Nylon-6 | 65⊕ | 60⊕ | 45⊕ | 50⊕ | 2.0 | 3.0 |
| Nylon-6,6 | 67⊕ | 60⊕ | 45⊕ | 50⊕ | 2.0 | 3.0 |
| Hard PVC | 18 | 20 | 16 | 17 | 3.0 | 3.0 |
| High Impact PVC | 8.0 | 10.0 | 4.0 | 9.5 | No adhesion occurred. | No adhesion occurred. |
| Soft PVC | 1.5 | 4.0 | 1.0 | 5.5 | No adhesion occurred. | No adhesion occurred. |
| Vinylon | 15⊕ | 15⊕ | 15⊕ | 15⊕ | 2.0 | 1.5 |
| PETP | 3.0 | 3.5 | 3.0 | 3.0 | No adhesion | No adhesion |

TABLE 4-continued

| Adhesive resin | Example 29 Modified elastomer of Example 1 | Example 30 Modified elastomer of Example 6 | Example 31 Modified elastomer of Example 10 | Example 32 Modified elastomer of Example 13 | Comparative Example 12 Modified polyolefin of Comparative Example 2 | Comparative Example 13 Modified polyolefin of Comparative Example 5 |
|---|---|---|---|---|---|---|
| PHTP | 4.0 | 4.0 | 4.0 | 4.0 | occurred. No adhesion occurred. | occurred. No adhesion occurred. |
| Aluminum sheet | 30⊕ | 30⊕ | 29 | 20 | 5 | 4 |
| Steel sheet | 25 | 27 | 25 | 25 | 6 | 5 |
| Steel sheet (treated with ZuPO$_4$) | 50 | 48 | 43 | 42 | 15 | <8 |
| Galvanized steel sheet | 25 | 26 | 22 | 23 | 6 | 5 |
| Tin plate | 20 | 21 | 16 | 15 | 5 | 5 |
| Copper Sheet | 25 | 23 | 21 | 22 | 5 | 4 |
| Stainless steel sheet | 25 | 24 | 21 | 21 | 6 | 5 |

What is claimed is:

1. A laminate comprising:
(A) a modified elastomer composition including modified elastomer and crystalline polyolefin prepared by the reaction of: 100 parts by weight of at least one elastomer selected from an ethylene/butene-1 copolymer, a styrene/butadiene copolymer and an ethylene/propylene copolymer wherein the ethylene content of said ethylene/butene-1 copolymer comprises 10 to 90% by weight of said copolymer and is Mooney viscosity at 100° C. is 10 to 200; and wherein the styrene content of said styrene/butadiene copolymer comprises 5 to 70% by weight of said copolymer and its Mooney viscosity at 100° C. is 10 to 200; and wherein the ethylene content of said ethylene/propylene copolymer comprises 10 to 90% by weight of said copolymer, its Mooney viscosity at 100° C. is 10 to 200 and its density is 0.85 to 0.90, and not more than 50 parts by weight of crystalline polyolefin with 0.005 to about 0.8 part by weight of an unsaturated carboxylic acid or its anhydride, and further including a radical generator and melting and kneading the mixture at 120° to 130° C., or
(B) a composition comprising (A) and a filler, and a material selected from the group consisting of metals, polyamides, polyesters, polyvinyl chloride and polyvinyl alcohol.

2. The laminate of claim 1, wherein said crystalline polyolefin is selected from the group consisting of high-density polyethylene, medium-density polyethylene, low-density polyethylene, crystalline ethylene/butene-1 copolymer, polypropylene, crystalline propylene/ethylene copolymer, polybutene-1 and poly(4-methyl-pentene-1), or mixture thereof.

3. The laminate of claim 1 wherein said metal is selected from the group consisting of aluminum, copper, zinc, nickel, iron, tin, stainless steel, brass, tin-plated iron, and galvanized sheet steel.

4. The laminate of claim 1 wherein said modified elastomer or said composition comprises either one layer of a two layer structure or the middle of a three layer structure.

5. The laminate of claim 2 wherein said crystalline polyolefin is selected from the group consisting of high-density polyethylene, low-density polyethylene and polypropylene.

6. The laminate of claim 1 wherein said radical generator is an organic peroxide.

7. The laminate of claim 1 wherein said unsaturated carboxylic acid or its anhydride is selected from the group consisting of maleic anhydride, acrylic acid and endo-bicyclo[2.2.1]-5-heptane-2, 3-dicarboxylic anhydride.

* * * * *